Aug. 21, 1956  R. J. NELSON  2,759,696
MEASURING TAPE TENSION HOLDER
Filed May 20, 1953  2 Sheets-Sheet 1
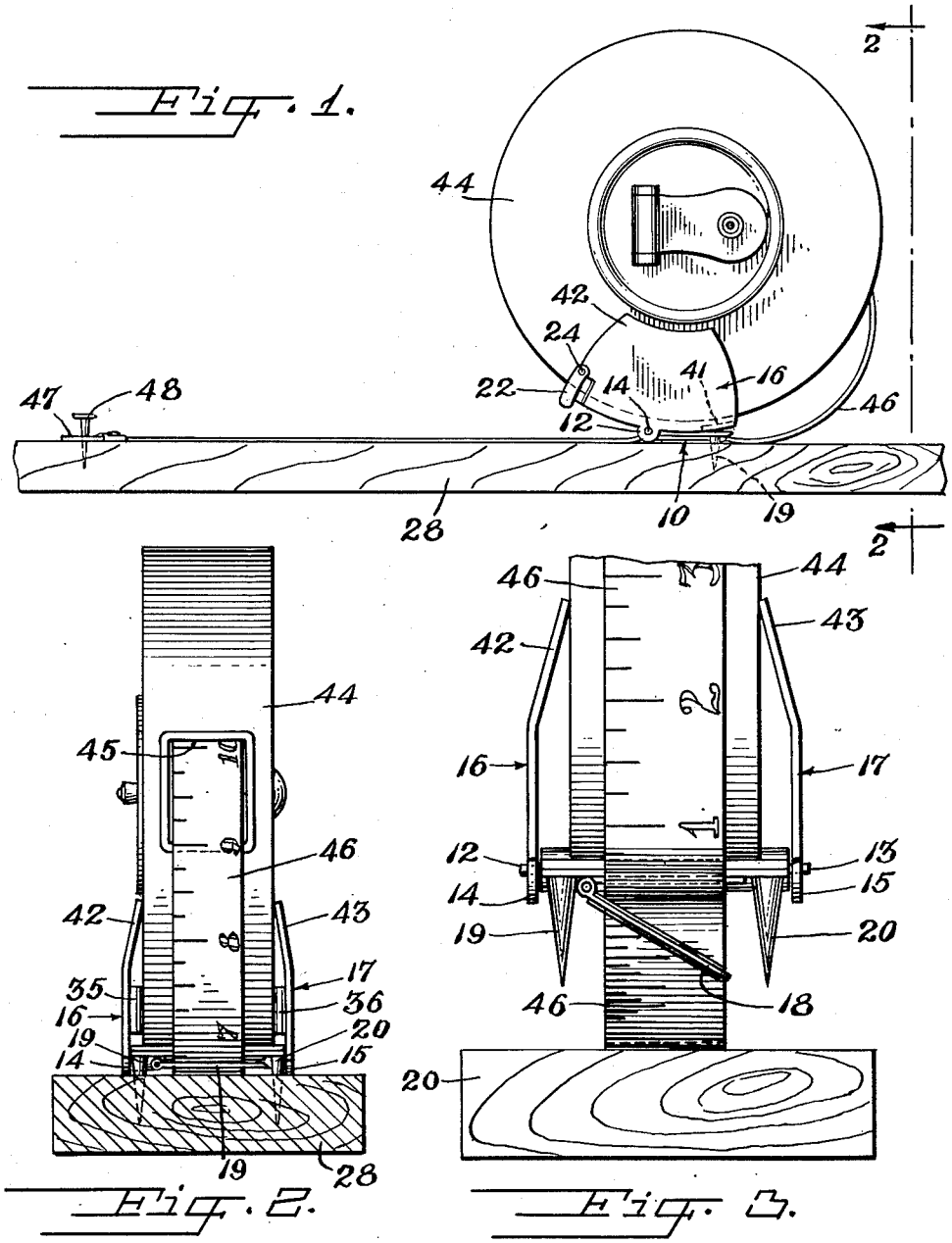
INVENTOR.
Raymond Jasper Nelson
BY *Victor J. Evans & Co.*
ATTORNEYS Aug. 21, 1956 R. J. NELSON 2,759,696
MEASURING TAPE TENSION HOLDER
Filed May 20, 1953 2 Sheets-Sheet 2
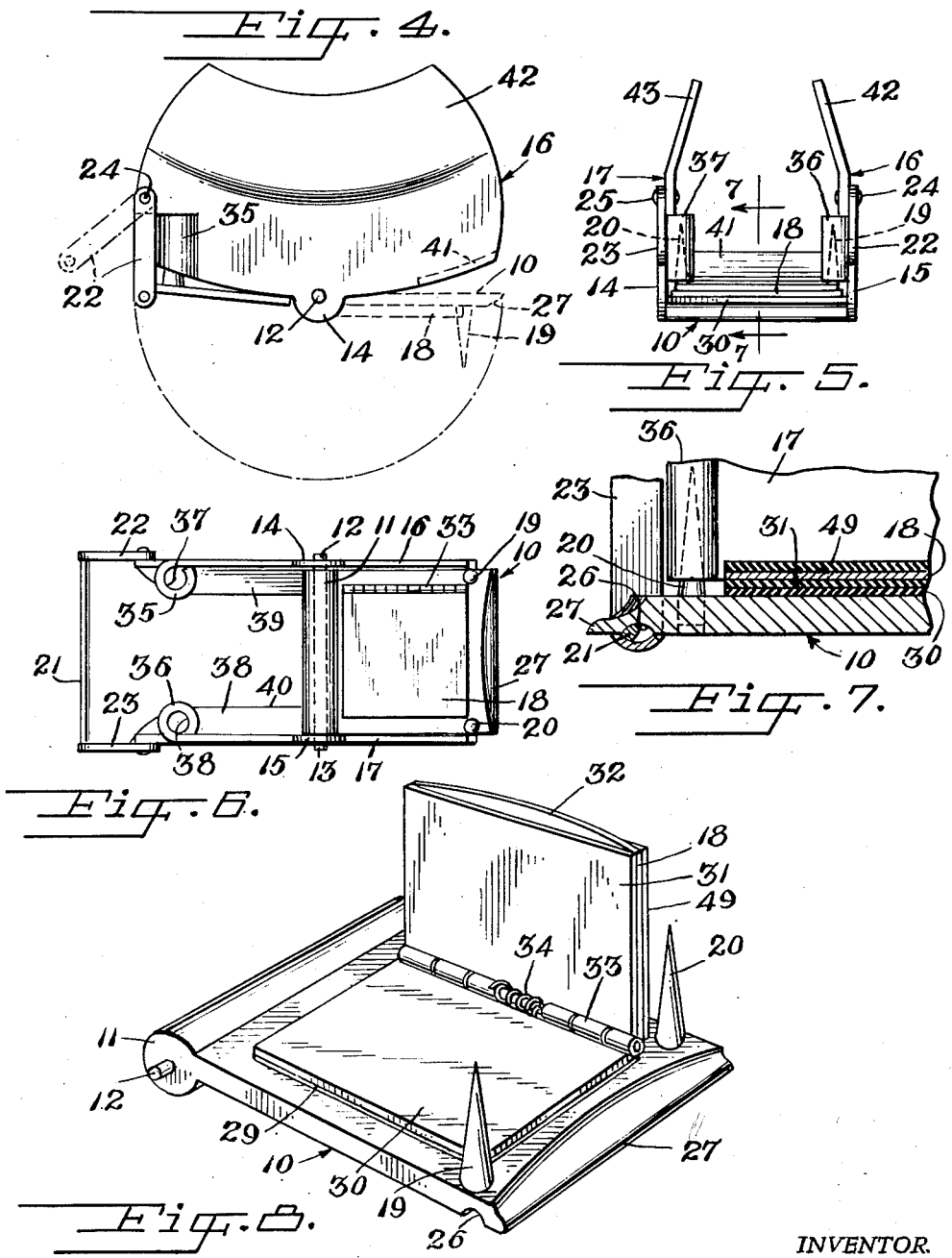
INVENTOR.
Raymond Jasper Nelson,
BY Victor J. Evans & Co.
ATTORNEYS United States Patent Office 2,759,696
Patented Aug. 21, 1956

2,759,696

MEASURING TAPE TENSION HOLDER

Raymond Jasper Nelson, Vallejo, Calif.

Application May 20, 1953, Serial No. 356,245

2 Claims. (Cl. 248—361)

This invention relates to measuring tape, particularly of the steel tape type, and in particular an attachment for a circular steel tape casing whereby with one end of the tape held over a nail, or the like the casing may be anchored at a point spaced from the nail to a wood beam, board, or other structural element with the tape in tension thereby facilitating taking measurements with the tape and marking the board or beam for cutting.

The purpose of this invention is to provide means for retaining a measuring tape in position upon work such as a board or beam whereby the hands of a carpenter, mechanic, or the like are free to take measurements and lay out points or designs on wood or on a member of other material.

Various devices have been provided for holding measuring tape in the conventional thin circular casing or housing of the tape to prevent the spring of the housing retrieving the tape, however, with such devices it is necessary to place the casing on one side and this twists the tape. With this thought in mind this invention contemplates an attachment adapted to be frictionally held to the side walls of the tape casing whereby with one end of a tape positioned with the ring thereof over a nail or the like pins of the attachment may be pressed into a member and the casing may remain in an upright position with the tape in tension.

The object of this invention is, therefore, to provide an attachment for measuring tape containers whereby the container or casing may be anchored in an upright position with the conventional spring at the end of the tape held at a remote point.

Another object of the invention is to provide an attachment for casings of measuring tape whereby the casing may be anchored in an upright position in which the attachment is frictionally secured in position on the casing without being permanently attached thereto.

A further object of the invention is to provide an anchoring attachment for a measuring tape casing in which the attachment is of a simple and economical construction.

With these and other objects and advantages in view the invention embodies an attachment in the form of a spring clip having a base with converging side walls and a pad having a cover with friction gripping surfaces on the pad and cover, and with pins extended from the base whereby with the base in one position the pins are adapted to extend into a piece of material on which the casing is positioned and wherein the pins are adapted to nest in spaces of the attachment with the base secured in a closed position with a bale or latch.

Other features and advantages of the invention will appear from the following description taken in connection with the drawings, wherein:

Figure 1 is a side elevational view illustrating the attachment in use wherein the ring at the end of a measuring tape is positioned over a nail with the casing of the tape secured by the attachment to a piece of material at a point spaced from the nail.

Figure 2 is a rear end elevational view taken on line 2—2 of Fig. 1 also showing the casing anchored to a piece of material and in which the parts are shown on an enlarged scale.

Figure 3 is a detail with the parts shown on a further enlarged scale showing the lower portion of the tape casing with the cover of the pad of the anchoring attachment dropped downwardly to permit threading the tape through the attachment.

Figure 4 is a side elevational view of the attachment with the base on which the pad and pins are positioned shown in the closed position in full lines and in the anchoring position in broken lines.

Figure 5 is an end elevational view of the attachment with the base shown in the closed position.

Figure 6 is a view looking upwardly toward the under surface of the attachment with the base in the anchoring position and with the latch for retaining the base in the closed position extended.

Figure 7 is a longitudinal section taken on line 7—7 of Fig. 5 showing the lower corner at one end of the attachment with the parts shown on an enlarged scale and with the device in the closed position.

Figure 8 is a perspective view showing the base of the attachment with the side walls and other parts omitted.

Referring now to the drawings wherein like reference characters denote corresponding parts the measuring tape anchoring attachment of this invention includes a base 10 having a cylindrical section 11 at one end with pins 12 and 13 extended from the cylindrical section with which the base is mounted in ears 14 and 15 of side walls 16 and 17 of the attachment, a cover 18 hinged to the base 10, pins 19 and 20 extended from the base and a latch bar 21 pivotally mounted by arms 22 and 23 and pins 24 and 25 to the side walls 16 and 17 of the attachment.

The under surface of the base 10 is provided with a transversely disposed slot 26 which is positioned to receive the latch bar 21 whereby with the latch bar shaped as shown in Fig. 7 a cam action is provided, locking the base in the closed position between the side plates and on one side of the center, as shown in Fig. 4. The end of the base, beyond the slot 26 is provided with an overhanging lip 27 that is positioned to receive a fingernail or tool to pry the pins 19 and 20 from a strip of wood or other material, as indicated by the numeral 28.

With the base in the position shown in Fig. 8, the upper surface is provided with a pad 29 on which a cover 30 of resilient material is positioned and a similar cover or sheet 31 also of a resilient material is provided on the under surface of the cover 18. The extended edge of the cover 18 is provided with a lip 32 to facilitate opening the cover with a fingernail or the like. The cover is hinged to the base with a hinge 33 and the hinge is provided with a spring 34 that urges the cover toward the closed position.

The ends of the side walls 16 and 17, at one end of the attachment are provided with rolled sections 35 and 36 which provide sockets 37 and 38 that are positioned to receive pins 19 and 20 with the base in the closed position as shown in Fig. 4.

The lower edges of the side walls 16 and 17 are provided with flanges 39 and 40 at one end and the edges are connected, at the opposite end with a web 41 whereby the side walls form a spring clip with upwardly extended sections 42 and 43 thereof converging from the upper edges of the side walls 16 and 17 and gripping the side surfaces of the measuring tape casing 44.

As illustrated in Fig. 1 the casing 44 is provided with an opening 45 from which tape as indicated by the numeral 46 extends and in use a ring 47 on the end of the tape may be held by a nail or brad as indicated by the numeral 48 to a piece of material, as indicated by the numeral 28.

With the parts in this position the measuring tape extends through the pad on the base 10 or, as illustrated in Fig. 1 the back of the cover 13 may also be provided with a sheet of resilient material 49 whereby the measuring tape may extend below the pad.

By this means the measuring tape may be withdrawn from a casing and with the end of the tape secured by a nail or other fastener the base 10 is released from the attachment, which may be frictionally held on the side of the casing of the tape and the pins 19 and 20 pressed into a piece of material at a point remotely situated from the nail 48 at the end of the tape whereby the tape may be anchored in tension and in such a position that measurements may readily be taken therefrom. After use the tape is returned to the casing and the base turned over with the pins extended into the sockets 37 and 38 in which position the base is held by the latch bar 21. The attachment may or may not be removed from the casing, as may be desired.

It will be understood that modifications, within the scope of the appended claims, may be made in the design and arrangement of the parts without departing from the spirit of the invention.

What is claimed is:

1. An attachment for use on a measuring tape casing comprising a clip, U-shaped in cross section and having resilient gripping side members, sockets on the clip at the lower ends of said side members, a base having pins extended from one end pivotally mounted in the clip and positioned whereby the pins extend, selectively, into the sockets of the clip or from the clip, means retaining the base in position with the pins extended into sockets of the clip, and a friction gripping pad positioned on the base.

2. In an attachment for a measuring tape casing, the combination which comprises a spring clip substantially U-shaped in cross section having converging friction elements extended from arms thereof, a base pivotally mounted in the clip, a pad of resilient material positioned on the base, a cover having pads of resilient material on the sides hinged to the base and positioned to coact with the pads of resilient material on the base, pins with pointed ends extended from the base, and means for retaining the base in the clip with the pins extended into the clip, said base adapted to be opened whereby the pins extend from the clip.

References Cited in the file of this patent

UNITED STATES PATENTS

| | | |
|---|---|---|
| 483,605 | Fien | Oct. 4, 1892 |
| 567,597 | Kerstetter | Sept. 15, 1896 |
| 1,811,945 | Lange | June 30, 1931 |
| 1,876,744 | Posgate | Sept. 13, 1932 |
| 2,035,379 | Stewart | Mar. 24, 1936 |
| 2,338,385 | Sorensen | Jan. 4, 1944 |
| 2,469,674 | Witchger | May 10, 1949 |
| 2,582,405 | Auchard | Jan. 15, 1952 |

FOREIGN PATENTS

| | | |
|---|---|---|
| 108,089 | Sweden | Aug. 3, 1943 |
| 229,107 | Great Britain | Feb. 19, 1925 |